3,219,648
POLYOLEFIN CATALYSTS AND PROCESSES
Robert W. Hill, Leawood, Kans., assignor, by mesne assignments, to Gulf Oil Corporation, Pittsburgh, Pa., a corporation of Pennsylvania
No Drawing. Filed Jan. 8, 1964, Ser. No. 336,370
26 Claims. (Cl. 260—93.7)

This invention relates to synthetic polymers. More particularly, this invention concerns novel catalyst compositions and processes for the polymerization of mono-1-olefins.

This application is a continuation-in-part of copending applications Serial No. 796,229, filed March 2, 1959 (now abandoned); Serial No. 800,953, filed March 23, 1959 (now abandoned); Serial No. 24,221, filed April 25, 1960, and now abandoned; Serial No. 24,222, filed April 25, 1960, and now abandoned; Ser. No. 199,656, filed June 4, 1962, and abandoned; Ser. No. 24,220, filed April 25, 1960.

It is known that catalysts formed by combining an organometallic compound of a metal of Groups IIA, IIB and IIIA of the Periodic Table with a halide of a metal of Groups IVB, VB or VIB of the Periodic Table are useful for polymerizing olefins at low pressures and low temperatures to form resinous polyolefins. (The Periodic Table referred to herein is published in Deming, General Chemistry (5th ed., Wiley, 1944), and is reprinted in Handbook of Chemistry and Physics, p. 336 (31st ed., Chem. Rubber, 1949).)

In preparing such catalysts, particularly suitable organometallic compounds are the alkyl, especially the lower alkyl compounds, of the metals of Groups IIA, IIB and IIIA, such as aluminum, zinc, cadmium and beryllium. Organometallic compounds in which the metal is attached to cycloalkyl radicals of 3 to 7 carbon atoms or aromatic radicals such as phenyl, as well as halogenated compounds such as dialkyl aluminum chlorides, are also suitable.

Some of the metal halides useful in preparing the aforementioned catalysts are the halides, particularly the chlorides and bromides, of titanium, zirconium, vanadium, chromium, molybdenum and tungsten, with the titanium and vanadium trichlorides and tetrachlorides being preferred, as well as the oxyhalides of such metals including vanadium oxychloride, and complexes such as $AlCl_3 \cdot 2TiCl_3$.

As specific examples of suitable organometallic compounds useful in forming the aforementioned catalysts may be mentioned the dialkyl cadmiums such as diethylcadmium, dimethylcadmium and diisobutylcadmium, the dialkylzincs such as diethylzinc and dibutylzinc, the trialkylaluminums and dialkylaluminum hydrides such as diisobutylaluminum hydride, diethylaluminum hydride, trimethylaluminum, triethylaluminum, tripropylaluminum, triisobutylaluminum and diethylaluminum chloride, the cycloalkyl metal compounds such as tricyclohexylaluminum, and the aryl metal compounds such as diphenylcadmium and dinaphthylzinc. The alkyl group on such compounds is advisably a lower alkyl and particularly such a group having 1 to 4 carbons.

These catalysts are conveniently produced by reacting the organometallic compound with the metal halide in the presence of a hydrocarbon solvent such as isooctane, n-heptane, xylene or benzene. The molar ratio between the organometallic compound and the halogenated metal may be varied within wide limits. A ratio of about 0.25 to about 4 moles of halogenated compound, such as a titanium or vanadium trichloride, to 1 mole of the organometallic compound is suitable. A typical catalyst system could be composed of triisobutylaluminum and titanium trichloride combined in an equimolar ratio.

Polymerization is usually effected with such catalysts by contacting the mono-1-olefin with the catalyst in the presence of an inert solvent such as benzene or a saturated hydrocarbon like isooctane, n-hexane, xylene, pentane or cyclohexane. The reaction is generally effected at a temperature of about 0 to 200° C., preferably at 40 to 150° C., and at pressures of about atmospheric or slightly above.

The above-described catalysts and processes are useful for polymerizing mono 1-olefins such as propylene, butene-1, pentene-1, hexene-1, 4-methyl-1-pentene, vinyl cyclohexane and styrene.

According to the present invention there are provided improved catalysts and processes suitable for polymerizing the aforementioned olefins.

These improved catalysts comprise the combination of (a) an organometallic compound in which the metal therein is selected from a member of the group consisting of Groups IIA, IIB and IIIA of the Periodic Table, (b) a metal halide in which the metal therein is selected from a member of the group consisting of Groups IVB, VB and VIB of the Periodic Table and (c) an additive compound selected from the group consisting of those polyamines, polyethers, aminoethers, aminoalcohols and hydroxyethers which normally chelate metals.

The organometallic compounds and the metal halides used in these improved catalysts are those which are described hereabove as components of the catalysts of the prior art; furthermore, the ratios of these components in the improved catalysts are the same as used in the prior art catalysts.

When these catalysts are employed in the novel processes hereafter described one obtains at least one or more of the following distinctly advantageous results: improved yield, greater crystallinity in the polymer formed, higher polymerization rate, increased stereospecificity and variable molecular weight.

Polymers formed of propylene and the higher mono 1-olefins can theoretically exist in more than one stereochemical configuration of which the isotactic and atactic polymers are the most important. In an isotactic polymer the substituted carbon atoms of the polymer chain all have the same individual configuration, at least for long stretches along the chain. An atactic polymer, on the other hand, is characterized by having the substituted carbon atoms of opposite configurations randomly distributed along the chain.

The stereochemical configuration of a polyolefin is important because the configuration has a profound effect on the mechanical properties of the polymer. This is primarily due to the relative ease of crystallization of the isotactic material. This ease of crystallization manifests itself in the fact that isotactic polymers have higher melting points, higher densities, higher flexural stiffness, lower solubilities in solvents and greater ease of orientation in fibers, resulting in higher tensile strengths of such fibers, than the corresponding atactic materials. Accordingly, the production of polyolefins containing a high proportion of isotactic to atactic polymer is advantageous.

While the prior art catalysts yield polymers of propylene and higher mono 1-olefins containing a substantial proportion of isotactic or crystalline material, it has been found that the catalyst compositions of this invention give polymers of increased isotactic content and thereby improved physical properties.

The mono 1-olefins such as those named hereabove are typical of the compounds which can be polymerized with the improved catalysts to yield polymers of increased isotactic content.

It has also been found that many of these improved catalysts produce a resinous product having a lower molecular weight as well as increased isotacticity. Such products have physical properties desirable in many applications due to improved processability. The measure of molecular weight used in making this discovery was the logarithmic viscosity number (inherent viscosity) measured in tetralin at 135° C. (See Billmeyer, Textbook of Polymer Chemistry, p. 128 (Interscience, 1957).)

As previously mentioned the additive compound employed in the improved catalysts of the invention is selected from the group consisting of those polyamines, polyethers, aminoethers, aminoalcohols and hydroxyethers which normally chelate metals. The polyamine additive compound which normally chelates metals must contain at least two nitrogen atoms present as substituted or unsubstituted amine groups. Surprisingly, monoamines or nonchelating polyamines do not significantly affect the crystallinity of the polymers.

Although such metal chelating polyamines having hydrogen atoms joined to the amino nitrogen atoms are effective in increasing crystallinity of the resulting polymer it is advisable to have relatively few such hydrogens in the additive compound because they decrease the solubility of the additive in the hydrocarbon solvents generally used for the polymerization medium. Thus, those metal chelating polyamines having tertiary and secondary amino groups are preferred additives due to their greater solubility in hydrocarbon solvents. However, additive compounds having primary amino groups are also effective and by selecting suitable conditions they give satisfactory results.

Representative polyamines that can be used include

N,N,N',N'-tetramethylethylenediamine,
N,N,N',N'-tetramethylmethylenediamine,
1,3-bis(dimethylamino)butane,
3-(diethylamino)propylamine,
N,N'-diethylethylenediamine,
N,N',N''-trimethyldiethylenetriamine,
N₁-phenyl-2-methyl-1,2 propanediamine,
Piperazine,
2-(2-N-pyrrolidinoethyl) piperidine,
2-aminopyridine,
N,N,N'-trimethylethylenediamine,
N,N'-dibenzylethylenediamine,
1-(dimethylamino)-4-amino pentane,
N,N'-diphenylethylenediamine,
α,α'-Ethylene-diimino-di(ortho-cresol),
N,N,N',N'-tetramethyl-1,3-butanediamine,
N,N,N',N'-tetramethyl-1,3-propanediamine,
2-(diallylamino)ethylamine,
1-dimethylamino-4 aminopentane,
N-benzyl-N,N'-dimethylethylenediamine,
N,N',N'',N'''-tetramethyl triethylenetetramine, and
N,N,N',N'-tetramethyl-1,4-butanediamine.

The polyether additive compound which normally chelates metals must contain two oxygen atoms bonded as ethers, at least one of which is acyclic. Surprisingly, monoethers and nonchelating polyethers do not significantly affect the crystallinity of the polymers.

Representative polyethers that can be used include 1,2-dimethoxyethane,
Tetrahydrofurfuryl methyl ether,
Veratrole,
Triethyleneglycol dimethyl ether,
Diethyleneglycol dimethyl ether,
Tetraethyleneglycol dimethylether,
1,2-diphenoxy-ethane, and
Ethyleneglycol hexyl methyl ether.

The aminoether additive compound which normally chelates metals must have both an amino nitrogen and an ether oxygen atom in the molecule.

Representative aminoethers that can be used include

N-ethylmorpholine,
2-ethoxyethylamine,
Bis(2 ethoxyethyl)amine, and
N,N-diethylamino-methyl-methyl ether The aminoalcohol additive compounds which normally chelate metals must have both an amino nitrogen and a hydroxyl oxygen in the molecule. Generally these will be separated by not more than about three aliphatic carbon atoms. The amino groups can be primary, secondary or tertiary.

Representative aminoalcohols which can be used are 2-diethylamino ethanol, 3-di-n-butylamino-1-propanol, 3-dimethylamino-1,2-propanediol, 2-(2-aminoethylamino)-ethanol, 2-dimethylamino-ethanol, methyldiethanolamine, aminoethylethanolamine, 2 - dimethylamino-2-propanol, N'-(2-hydroxypropyl)-2-methyl-1,2-propanediamine, 1,3-bis(dimethylamino)-2-propanol and 1-dimethylamino-2-propanol.

The hydroxyether additive compounds which normally chelate metals must have both an ether oxygen and a hydroxyl oxygen in the same molecule.

Representative hydroxyethers which can be used are N-hexyl Cellosolve and 1,3-dimethoxy-propanol-2.

The novel catalysts of this invention are conveniently prepared by combining at least one of the additive compounds with the organometallic compound and the metal halide components in an inert hydrocarbon solvent, such as isooctane, n-heptane, xylene or benzene, or by combining the additive compound with either the organometallic compound or the metal halide before the other is added to form the catalyst, since the order of addition does not critically affect the process.

Thus, by way of illustration, an aminoalcohol additive compound may be added to titanium or vanadium trichloride prior to the addition of the organometallic compound, or the additive may be added to the organometallic compound prior to the addition of titanium or vanadium trichloride, or the catalyst components and additive may be added to an inert solvent containing the olefin to be polymerized. Furthermore, two or more additives can be used if desired.

In general, up to about 0.5 mole of the additive compound per mole of organometallic compound is suitable for producing the catalyst. However, about 0.50 to about 0.5 mole of additive for each mole of organometallic compound is preferably used. Amounts less than 0.05 can be used but with some sacrifice in efficiency.

When a dialkylaluminumhydride is used as the organometallic component of the catalyst it may be conveniently prepared in situ by heating the corresponding trialkylaluminum compound in an inert solvent such as n-decane at an elevated temperature such as about 125 to 170° C. for from 1 to 4 hours. However, the mode of preparation appears to result in no significant difference in activity of the hydride.

Heating the improved catalyst when combined in an inert solvent at moderately elevated temperature improves the reactivity of the catalyst. By heating is normally meant temperatures of about 60–65° C. although with some additive compounds higher temperatures of up to 100° C. or higher can be used. Those catalysts prepared for diolefin polymerization are advantageously heated at the higher temperatures, e.g., 120–170° C. for about 4 hours. Apparently a complexing results upon heating because a color change is obtained and a precipitate often results.

The polymerization of an olefin employing the described improved catalyst containing in combination at least one of the above described additive compounds is readily effected using an inert solvent such as benzene and saturated hydrocarbons like isooctane, n-heptane, n-hexane, pentane, xylene, decane or cyclohexane as the polymerization medium. The polymerization reaction is effected at a temperature from about 0° C. to 200° C. and usually not above 150° C. with the process advisably being effected at 25° C. to 85° C. It is important to note, however, that the catalyst may be preformed or activated at temperatures higher or lower than those used in the polymerization itself. Temperatures of catalyst formation higher than used in the polymerization may be necessary for activation, while catalyst formation at lower temperatures than used in the polymerization may be needed to avoid thermal instability of the catalyst in the absence of the olefin. Polymerization is advisably effected at about atmospheric pressure or slightly higher. A particularly suitable pressure is 30 p.s.i.g. although higher pressures can be used, but are not needed.

The process is conveniently effected batch-wise by first combining the organometallic compound and metallic halide in an inert solvent, and advisably in an inert atmosphere and adding the additive compound to the catalyst slurry. After the catalyst is prepared the olefin is added to the mixture. The reactor is heated slightly under autogenous pressure. At completion of the polymerization reaction, the polymer slurry is filtered to isolate the resinous polyolefin. Low molecular weight non-resinous polymers remains in solution in the filtrate. The solid product so obtained is then freed of catalyst residues by any of several known techniques. One method is to stir a slurry of the polyolefin in water or an alcohol such as methanol and then remove the insoluble resinous polyolefin by filtration to give a white product. The polyolefins soluble in the reaction solvent can be isolated by adding an excess of methanol and filtering off the precipitated polymer.

Of course, the polymerization can be adapted readily to a continuous process under the proper conditions.

The increase in crystallinity of polyolefins produced using the improved catalyst containing one of the additive compounds herein described may be determined by means of infrared measurements which give the relative crystallinity of the polymer. For each polymer produced, with and without an additive, pairs of infrared adsorption bands are determined by observing the infrared spectrum both above as well as below the melting point of the polymer. Absorption bands which are due to crystalline vibrations in the polymer may be identified as those which disappear when the polymer melts. Those bands which do not change on melting are independent of the crystallinity and can be used as a standard of comparison. In the case of polypropylenes, the ratio of intensities of absorption bands at 11.89 microns and 10.28 microns was taken as a measure of relative crystallinity in the following examples. Similarly, the ratio of intensities of bands at 11.77 microns and 2.35 microns gave the relative crystallinity of poly-1-butene. Bands at 10.05 microns and 2.38 microns were used in the examples for poly-(4-methyl-1-pentene).

There are indications that the additive compounds accelerate the polymerization with the herein described catalysts.

By proper selection of the additive compounds or combinations thereof, a wide range of molecular weights is obtainable. By mixing a high viscosity additive and a low viscosity additive high crystallinity is achieved while the effect on viscosity cancels out and the resultant viscosity of the polymer is the same as if no additive is used. For example, 3-(diethylamino)propylamine, N,N',N''-trimethyldiethylenetriamine, N,N'-diethylethylenediamine and N,N,N'-trimethylethylenediamine lower the viscosity of both polypropylene and polybutylene. N-phenyl-2-methyl-1,2,-propane-diamine and N,N'-dibenzylethylenediamine lower the viscosity of polypropylene but have no measurable affect on polybutylene. 2-(2-N-pyrrolidinoethyl) piperidine lowers the viscosity of polybutylene.

Other additives appear to increase the molecular weight. One such additive is tetramethylmethylenediamine.

The following examples are presented to illustrate specific embodiments of the invention.

EXAMPLE 1

A series of propylene polymerizations in the presence of various additives was carried out. Two-hundred ml. of sodium-dried isooctane, 3 ml. of a 10% slurry of titanium trichloride in isoctane, 10 ml. of a 25% solution of triisobutyl aluminum in isooctane and 10 ml. of a 0.1 molar solution of the additive in isooctane, corresponding to a 0.11 molar ratio of additive to aluminum compound, were charged into a 12 oz. bottle capable of withstanding 300 p.s.i. internal pressure. Propylene gas was then introduced with shaking until the autogeneous pressure was 30 p.s.i.g. and the bottle agitated overnight in a water bath mantained at 70° C. At the end of this period, the bottle was cooled and the contents filtered through a cloth filter with suction. The solid, insoluble product obtained by filtration was stirred with several portions of methanol in a Waring blender until the solid and supernatant liquids were colorless. The solid was then dried to give a friable white product. The relative crystallinity was determined by infrared analysis, as described above, of a specimen of film prepared from a sample of the resin. Table 1 sets out the results obtained with various additives and control tests in which no additives were used.

Table 1

| Run No. | Additive | Relative crystallinity | Yield (g.) |
|---|---|---|---|
| 1 | None | .816 | 5.8 |
| 2 | do | .853 | 6.0 |
| 3 | do | .831 | 5.8 |
| 4 | do | .840 | 6.0 |
| 5 | Triethylamine | .847 | 6.4 |
| 6 | N,N,N',N'-tetramethylethylenediamine | .910 | 11.7 |
| 7 | N,N,N',N'-tetramethylmethylenediamine | .926 | 9.2 |

It can be readily seen that the polyamine additives increased the percentage of crystallinity present in the product and also increased the yield of resinous product. It can also be seen that the mono amine (triethylamine) did not increase substantially the percent of crystallinity of the product.

EXAMPLE 2

A series of runs was carried out as described in Example 1 except that 5 ml. of a 10% slurry of titanium trichloride in isooctane was used and 25 ml. of butene-1 was charged to the bottle instead of propylene. Table 2 gives the results.

Table 2

| Run No. | Additive | Relative crystallinity | Yield (g.) |
|---|---|---|---|
| 1 | None | 1.30 | 10.4 |
| 2 | do | 1.50 | 9.9 |
| 3 | do | 1.54 | 11.8 |
| 4 | do | 1.22 | 9.6 |
| 5 | Triethylamine | 1.19 | 9.8 |
| 6 | N,N,N',N'-tetramethylmethylenediamine | 1.83 | 11.9 |
| 7 | N,N,N',N'-tetramethylethylenediamine | 1.71 | 12.3 |
| 8 | N,N,N',N'-tetramethyl-1,3-butanediamine | 1.91 | 12.5 |

Again, it can be readily seen that the additives increased the percent crystallinity and that triethylamine did not increase the crystallinity or yield.

EXAMPLE 3

Another series was carried out as described in Example 2 with butene-1. The results are recorded in Table 3.

Table 3

| Run No. | Additive | Relative crystallinity | Yield (g.) |
|---|---|---|---|
| 1 | None | 1.69 | 11.3 |
| 2 | N,N',N''-trimethyldiethylenetriamine. | 2.08 | 12.8 |
| 3 | N,N'-diethylethylenediamine | 1.76 | 11.9 |
| 4 | 2-(2-N-pyrrolidinoethyl)piperidine. | 1.90 | 8.9 |
| 5 | N,N,N'-trimethylethylenediamine. | 1.79 | 11.7 |
| 6 | $N_t$-phenyl-2-methyl-1,2-propanediamine. | 1.76 | 9.9 |
| 7 | 2-aminopyridine | 1.72 | 7.2 |

EXAMPLE 4

Another series of butene-1 polymerizations was run as in Example 2 using 10 ml. of a 10% slurry of vanadium trichloride, in place of titanium trichloride, at 75° C. The following table gives the results.

Table 4

| Run No. | Additive | Relative crystallinity | Yield (g.) |
|---|---|---|---|
| 1 | None | 0.74 | 12.7 |
| 2 | do | 0.75 | 11.4 |
| 3 | Pyridine | 0.53 | 11.1 |
| 4 | N,N,N',N'-tetramethylethylenediamine. | 1.12 | 11.4 |
| 5 | N,N,N',N'-tetramethylmethylenediamine. | 0.87 | 10.9 |

Again, it can be seen that the polyamines increased the percent crystallinity and the mono amine, pyridine, actually decreased the crystallinity content.

EXAMPLE 5

Two-hundred ml. of sodium-dried isooctane, 5 ml. of a 10% slurry of titanium trichloride in isooctane, 10 ml. of a 25% solution of triisobutylaluminum in isooctane and 10 ml. of a 0.1 molar solution of additive in isooctane (corresponding to a molar ratio of additive to aluminum compound of 0.11) were charged into a 12 oz. bottle capable of withstanding 300 p.s.i. internal pressure. 4-methyl-1-pentene (22.4 ml.; 15 g.) was then added to the bottle and the resulting mixture agitated overnight in a water bath maintained at 75° C. The solid polymer was isolated as described above and stirred with methanol to give a friable white product. Table 5 shows the results obtained.

Table 5

| Run No. | Additive | Relative crystallinity | Yield (g.) |
|---|---|---|---|
| 1 | None | 1.78 | 4.4 |
| 2 | do | 1.75 | 4.7 |
| 3 | N,N,N',N'-tetramethylmethyldiamine. | 2.21 | 6.0 |

EXAMPLE 6

Another series of propylene polymerizations was carried out in the presence of various additives as described in Example 1, except that 5 ml. of a 10% slurry of titanium trichloride in isooctane was used. The relative crystallinity was determined as before and the logarithmic viscosity number was also determined. The results are set out in Table 6.

Table 6

| Run No. | Additive | Relative crystallinity | LVN* | Yield (g.) |
|---|---|---|---|---|
| 1 | None | .775 | 3.00 | 6.5 |
| 2 | 3-(diethylamino)propylamine | .895 | 1.47 | 7.3 |
| 3 | N, N', N''-trimethyldiethylenetriamine. | .910 | 2.17 | 8.4 |
| 3A | do | .870 | 2.18 | 8.5 |
| 4 | N,N'-diethylethylenediamine | .934 | 1.70 | 7.1 |
| 5 | N,N,N'-trimethylethylenediamine. | .886 | 1.46 | 7.0 |
| 6 | $N_t$-phenyl-2-methyl-1,2-propanediamine. | .887 | 1.67 | 6.5 |
| 7 | 2-aminopyridine | .783 | 2.66 | 6.5 |
| 8 | N,N'-dibenzylethylenediamine. | .915 | 1.40 | 6.7 |
| 9 | None | .791 | 2.87 | 10.4 |
| 10 | N,N,N',N'-tetramethylmethylenediamine. | .962 | 4.37 | 15.1 |

*Logarithmic viscosity number (inherent viscosity) measured in tetralin at 135° C.

It can be readily seen that some of the additives not only increased the percent crystallinity, but also lowered the logarithmic viscosity number, which is indicative of a lower molecular weight. Yet, N,N,N',N'-tetramethylmethylenediamine raised the LVN, indicative of a higher molecular weight.

EXAMPLE 7

A series of propylene polymerizations was carried out in the presence of various additives as described in Example 1, except that 5 ml. of a 10% slurry of titanium trichloride in isooctane was used. Table 7 gives the results.

Table 7

| Run No. | Additive | Relative crystallinity | LVN | Yield (g.) |
|---|---|---|---|---|
| 1 | None | .760 | 2.79 | 6.4 |
| 2 | 1,3-bis(dimethylamino)-propanol-2. | .914 | 3.55 | 9.5 |
| 3 | 1-(dimethylamino)-4-aminopentane. | .821 | 3.34 | 8.9 |
| 4 | N,N'-diphenylethylenediamine. | .891 | 1.62 | 7.1 |

EXAMPLE 8

A series of butene-1 polymerizations was carried out as described in Example 2, using various additives. The results are presented in Table 8.

Table 8

| Run No. | Additive | Relative crystallinity | LVN | Yield (g.) |
|---|---|---|---|---|
| 1 | None | 1.61 | 4.52 | 9.4 |
| 2 | 1,3-bis(dimethylamino) propanol-2. | 1.70 | 3.39 | 11.3 |
| 3 | α,α'-Ethylenediiminodi(ortho-cresol). | 2.05 | 5.25 | 7.6 |

The same procedure of this example was used in a separate series of runs and the results are reported in Table 8A.

Table 8A

| Run No. | Additive | Relative crystallinity | LVN | Yield (g.) |
|---|---|---|---|---|
| 1 | None | 1.25 | 3.66 | 6.2 |
| 2 | $N_t$-(2-hydroxypropyl)-2-methyl-1, 2-propanediamine. | 1.33 | 3.39 | 8.1 |
| 3 | $N_t$-phenyl-2-methyl-1, 2-propanediamine. | 1.49 | 3.98 | 5.7 |

EXAMPLE 9

Another series of propylene polymerization was carried out as described in Example 7. The results are set out in Table 9.

Table 9

| Run No. | Additive | Relative crystallinity | LVN | Yield (g.) |
|---|---|---|---|---|
| 1 | None | .801 | 2.87 | 7.1 |
| 2 | N,N,N',N'-tetramethyl-1,3-butanediamine | .822 | 3.01 | 7.9 |
| 3 | ___do___ | .823 | 3.26 | 7.8 |
| 4 | N,N'-dibenzylethylenediamine | .884 | 1.59 | 7.2 |
| 5 | ___do___ | .871 | 1.51 | 7.1 |
| 7 | None | .806 | 2.92 | 6.0 |
| 8 | N,N'-diethylethylenediamine | .881 | 1.56 | 7.3 |
| 9 | N,N,N'-trimethylethylenediamine | .902 | 1.39 | 7.1 |
| 10 | ___do___ | .895 | 1.40 | 7.1 |
| 11 | N,N'-diphenylethylenediamine | .878 | 1.62 | 7.0 |
| 13 | N,N,N',N'-tetramethyl-1,3-propanediamine | .813 | 2.82 | 7.1 |
| 14 | ___do___ | .849 | 2.81 | 6.8 |
| 15 | N,N'N''-triethyl diethylenetriamine | .881 | 1.30 | 8.8 |
| 16 | ___do___ | .894 | 1.28 | 8.7 |

EXAMPLE 10

Another series of propylene polymerization was carried out as described in Example 7. The results are set out in Table 10.

Table 10

| Run No. | Additive | Relative crystallinity | LVN | Yield (g.) |
|---|---|---|---|---|
| 1 | None | .825 | 3.37 | 7.1 |
| 2 | 2-(diallylamino)ethylamine | .861 | 1.64 | 7.5 |
| 3 | 1-dimethylamino-4-aminopentane | .837 | 4.68 | 9.6 |
| 4 | ___do___ | .836 | 4.94 | 9.6 |
| 5 | N,N'-diphenylethylenediamine | .920 | 1.53 | 7.6 |
| 6 | N-methylaniline | .719 | 3.50 | 7.2 |
| 7 | N-benzyl-N,N'-dimtehylethylenediamine | .910 | 1.92 | 8.7 |
| 8 | ___do___ | .940 | 1.91 | 8.6 |

The results show that the polyamines increased the crystallinity of the polymer and the monoamine, N-methylaniline decreased the crystallinity.

EXAMPLE 11

Continuing the series of propylene polymerization as in Example 7, the following results were obtained, as set out in Table 11.

Table 11

| Run No. | Additive | Relative crystallinity | LVN | Yield (g.) |
|---|---|---|---|---|
| 1 | None | .784 | 3.08 | 6.8 |
| 2 | N,N',N'',N'''-tetramethyl triethylenetetramine | .906 | 1.90 | 6.5 |

EXAMPLE 12

Another series of propylene polymerizations was carried out as described in Example 1, except that 5 ml. of a 10% slurry of the complex $AlCl_3 \cdot 2TiCl_3$ in isooctane was used instead of titanium trichloride. The results are set out in Table 12.

Table 12

| Run No. | Additive | Relative crystallinity | LVN | Yield (g.) |
|---|---|---|---|---|
| 1 | None | .764 | 3.92 | 8.5 |
| 2 | ___do___ | .759 | 4.23 | 8.5 |
| 5 | N,N,N',N'-tetramethyl-methylenediamine | .841 | 4.01 | 9.2 |
| 6 | ___do___ | .843 | 4.26 | 9.3 |
| 7 | N,N'-diethylethylenediamine | .915 | 2.09 | 8.6 |
| 8 | ___do___ | .963 | 2.06 | 8.3 |

EXAMPLE 13

Several propylene polymerizations were carried out with triisobutylaluminum and titanium tetrachloride as the catalyst system. To a 12 oz. bottle containing 185 ml. of sodium-dried n-heptane was added 0.3 ml. (0.5 gram) of titanium tetrachloride and 10 ml. of a 0.1 molar solution of the additive in n-heptane. Ten ml. of a 25% by weight solution of triisobutylaluminum (1.7 g.) in n-heptane was added and then propylene was introduced to bring the autogenous pressure to 30 p.s.i.g. The bottle was agitated overnight (16 hours) in a water bath maintained at 75° C. The insoluble polymer was isolated and analyzed as described in Example 1. The results are presented in Table 13.

Table 13

| Run No. | Additive | Relative crystallinity | LVN | Yield (g.) |
|---|---|---|---|---|
| 1 | None | .732 | 2.01 | 3.4 |
| 2 | ___do___ | .731 | 3.03 | 2.0 |
| 3 | N,N'-diphenylethylenediamine | .782 | 4.03 | 0.3 |
| 5 | N,N,N',N'-tetramethyl-1,4-butanediamine | .752 | 3.85 | 0.9 |

EXAMPLE 14

Another series of propylene polymerizations was carried out with the catalyst system of Example 13, except that 1.5 ml. (2.6 g.) of titanium tetrachloride was used. The procedure was the same as Example 13. The results are set out in Table 14.

Table 14

| Run No. | Additive | Relative crystallinity | LVN | Yield (g.) |
|---|---|---|---|---|
| 1 | None | (*) | (*) | 0.1 |
| 2 | ___do___ | (*) | (*) | 0.1 |
| 3 | N,N,N',N'-tetramethyl-1,4-butanediamine | .670 | 0.82 | 0.7 |
| 4 | N,N',N'',N'''-tetramethyl-triethylenetetramine | .787 | 0.80 | 0.7 |
| 6 | N,N,N',N'-tetramethyl-methylenediamine | .860 | 1.78 | 0.7 |

*Yield too low to determine relative crystallinity of LVN.

EXAMPLE 15

Propylene was polymerized by the procedure of Example 1 with diethyl zinc and titanium tetrachloride. The catalyst system was prepared by adding 2 ml. (3.6 g.) of titanium tetrachloride to 185 ml. of sodium-dried n-heptane, then 10 ml. of a 0.1 molar solution of the additive in n-heptane (when the additive was used), and then 3.6 ml. (4.2 g.) of diethyl zinc in n-heptane was added. The results are presented in Table 15.

Table 15

| Run No. | Additive | Relative crystallinity | LVN | Yield (g.) |
|---|---|---|---|---|
| 1 | None | (*) | | 0.6 |
| 2 | N,N',N''-trimethyl diethylenetriamine | .816 | 0.75 | 1.4 |
| 3 | N,N'-diphenylethylenediamine | .811 | 0.80 | 1.5 |

*The product obtained when no catalyst additive was used was a non-crystalline, sticky grease.

EXAMPLE 16

Propylene was polymerized using titanium trichloride and diisobutylaluminum hydride as the Ziegler-type catalyst. The procedure was as described in Example 13 except that 0.5 gram of titanium trichloride and 10 ml. of a 0.9 molar solution of diisobutylaluminum hydride in n-decane were used. Table 16 gives the results.

Table 16

| Run No. | Additive | Relative crystallinity | LVN | Yield (g.) |
|---|---|---|---|---|
| 1 | None | .831 | 2.64 | 7.3 |
| 3 | N,N,N',N'-tetramethyl-methylenediamine | .891 | Insol. | 9.3 |

EXAMPLE 17

A series of propylene polymerizations in the presence of various additives was carried out. Two-hundred ml. of sodium-dried isooctane, 3 ml. of a 10% slurry of titanium trichloride in isooctane, 10 ml. of a 25% solution of triisobutyl aluminum in isooctane and 10 ml. of a 0.1 molar solution of the additive in isooctane, corresponding to a 0.11 molar ratio of additive to aluminum compound, were charged into a 12 oz. bottle capable of withstanding 300 p.s.i. internal pressure. Propylene gas was then introduced with shaking until the autogenous pressure was 30 p.s.i.g. and the bottle agitated overnight in a water bath maintained at 75° C. At the end of this period, the bottle was cooled and the contents filtered through a cloth filter with suction. The solid, insoluble product obtained by filtration was stirred with several portions of methanol in a Waring Blendor until the solid and supernatant liquids were colorless. The solid was then dried to give a friable white product. The relative crystallinity was determined by infrared analysis, as described above, of a specimen of film prepared from a sample of the resin. Table 17 sets out the results obtained with various additives and control tests in which no additives were used.

Table 17

| Run No. | Additive | Relative crystallinity | Yield (g.) |
|---|---|---|---|
| 1 | None | .816 | 5.8 |
| 2 | do | .853 | 6.0 |
| 3 | do | .831 | 5.8 |
| 4 | do | .840 | 6.0 |
| 5 | Diethyl ether | .850 | 6.6 |
| 6 | 1,2-dimethoxyethane | .989 | 7.0 |
| 7 | do | .953 | 6.8 |
| 8 | do | .965 | 8.7 |
| 9 | do | .937 | 6.4 |
| 10 | Diethylene glycol dimethyl ether | .894 | 8.9 |
| 11 | do | .910 | 7.7 |

It can be readily seen that the polyether additives increased the percentage of crystallinity present in the product and also increased the yield of resinous product. It can also be seen that the monoether (diethylether) did not substantially increase the percent of crystallinity of the product.

EXAMPLE 18

A series of runs was carried out as described in Example 17 except that 5 ml. of a 10% slurry of titanium trichloride in isooctane was used and 25 ml. of butene-1 was charged to the bottle instead of propylene. Table 18 gives the results.

Table 18

| Run No. | Additive | Relative crystallinity | Yield (g.) |
|---|---|---|---|
| 1 | None | 1.30 | 10.4 |
| 2 | do | 1.50 | 9.9 |
| 3 | do | 1.54 | 11.8 |
| 4 | do | 1.22 | 9.6 |
| 5 | Diethyl ether | 1.46 | 8.6 |
| 6 | 1,3-dimethoxypropanol-2 | 1.75 | 12.8 |
| 7 | 1,2-dimethoxyethane | 1.71 | 6.8 |
| 8 | Tetrahydrofurfurylmethyl ether | 1.84 | 6.8 |
| 9 | Veratrole | 1.93 | 7.4 |
| 10 | Triethylene glycol dimethyl ether | 1.77 | 2.5 |

Again, it can be readily seen that the additives increased the percent crystallinity and that diethyl ether did not increase the crystallinity or yield.

EXAMPLE 19

Another series was carried out as described in Example 18 with butene-1. The results are recorded in Table 19.

Table 19

| Run No. | Additive | Relative crystallinity | Yield (g.) |
|---|---|---|---|
| 1 | None | 1.30 | 6.5 |
| 2 | do | 1.27 | 6.5 |
| 3 | 1,2-dimethoxyethane | 1.74 | 7.3 |
| 4 | N-ethylmorpholine | 1.59 | 5.5 |

The results show that the polyether and aminoether increased crystallinity.

EXAMPLE 20

Another series was carried out as described in Example 18 with butene-1. However, the titanium tricholride was obtained from a different supplier than that used in the previous runs. The results are recorded in Table 20.

Table 20

| Run No. | Additive | Relative crystallinity | Yield (g.) |
|---|---|---|---|
| 1 | None | 1.64 | 10.3 |
| 2 | do | 1.53 | 12.6 |
| 3 | 1,2-dimethoxyethane | 1.93 | 13.1 |
| 4 | 1,3-dimethoxypropanol-2 | 1.89 | 14.1 |

EXAMPLE 21

A series of butene-1 polymerizations was carried out as described in Example 18 except that 3 ml. of a 10% slurry of vanadium trichloride was used instead of titanium trichloride and the polymerization was carried out at 50° C. The following table sets out the results.

Table 21

| Run No. | Additive | Relative crystallinity | Yield (g.) |
|---|---|---|---|
| 1 | None | 0.92 | 15.2 |
| 2 | do | 0.87 | 15.1 |
| 3 | do | 0.96 | 14.7 |
| 4 | N-methylmorpholine | 1.08 | 11.9 |
| 5 | do | 1.11 | 13.3 |
| 6 | 1,2-dimethoxyethane | 1.26 | 5.7 |
| 7 | do | 1.25 | 14.2 |

EXAMPLE 22

Another series of butene-1 polymerizations was run using 5 ml. of a 10% slurry of vanadium trichloride as described in Example 21; however, these polymerizations were run at 75° C. The following table gives the results.

Table 22

| Run No. | Additive | Relative crystallinity | Yield (g.) |
|---|---|---|---|
| 1 | None | 1.05 | 11.8 |
| 2 | do | 1.19 | 11.1 |
| 3 | 1,2-dimethoxyethane | 1.47 | 7.0 |
| 4 | 1,2-dimethoxyethane* | 1.33 | 3.3 |

*Twice as much additive was used to give a 0.22 molar ratio of additive to aluminum compound.

EXAMPLE 23

Two-hundred ml. of sodium dried isooctane, 5 ml. of a 10% by weight slurry of titanium trichloride in isooctane, 10 ml. of a 25% by weight solution of triisobutylaluminum in isooctane and 10 ml. of a 0.1 molar solution in isooctane (corresponding to a molar ratio of additive to aluminum compound of 0.11) of additive were charged into a 12 oz. bottle capable of withstanding 300 p.s.i. internal pressure. 4-methyl-1-pentene (22.4 ml.; 15 g.) was then added to the bottle and the resulting mixture agitated overnight in a water bath maintained at 75° C. The solid polymer was isolated as described above and stirred with methanol to give a friable white product. Table 23 shows the results obtained.

Table 23

| Run No. | Additive | Relative crystallinity | Yield (g.) |
|---|---|---|---|
| 1 | None | 1.78 | 4.4 |
| 2 | do | 1.75 | 4.7 |
| 3 | 1,2-dimethoxyethane | 1.92 | 2.5 |

EXAMPLE 24

Another series of propylene polymerizations was carried out in the presence of various additives as described in Example 17, except that 5 ml. of a 10% slurry of titanium trichloride in isooctane was used. The relative crystallinity was determined as before. The results are set out in Table 24.

Table 24

| Run No. | Additive | Relative crystallinity | Yield (g.) |
|---|---|---|---|
| 1 | None | .801 | 7.1 |
| 2 | Triethylene glycol dimethyl ether | .899 | 9.8 |
| 3 | do | .928 | 9.6 |
| 4 | Tetraethylene glycol dimethyl ether | .874 | 9.8 |
| 5 | do | .899 | 9.4 |
| 6 | 1,3-dimethoxy propanol-2 | .857 | 7.7 |
| 7 | do | .856 | 7.7 |
| 8 | Veratrole | .855 | 8.0 |
| 9 | do | .822 | 7.9 |
| 10 | Tetrahydrofurfuryl methyl ether | .866 | 9.0 |
| 11 | do | .861 | 9.0 |

EXAMPLE 25

The procedure of Example 24 was followed and the following results obtained:

Table 25

| Run No. | Additive | Relative crystallinity | Yield (g.) |
|---|---|---|---|
| 1 | None | .760 | 6.4 |
| 2 | 1,2-diphenoxyethane | .796 | 7.1 |

EXAMPLE 26

Butene-1 was polymerized as in Example 18 and the results of Table 26 obtained.

Table 26

| Run No. | Additive | Relative crystallinity | LVN | Yield (g.) |
|---|---|---|---|---|
| 1 | None | 1.61 | 4.52 | 9.4 |
| 2 | 1,2-diphenoxyethane | 1.75 | 4.58 | 10.8 |

The relative crystallinity of polyolefins may also be estimated by the amount of soluble polymer present. The literature states that the atactic fraction of polybutene is soluble in hot solvents, such as diethyl ether, methylene chloride and pentane, whereas the isotactic polymer is insoluble (Belgian Patent 562,936). Accordingly, the amount of polymer extracted from a sample by such solvents is a measure of the crystalline or isotactic content of the sample.

EXAMPLE 27

Butene-1 was polymerized by the procedure described in Example 18, except in the presence of 1,2-dimethoxyethane (10 ml. of a 0.1 molar solution in isooctane). The product had a relative crystallinity ratio of 1.92. Soxhlet extraction of this material with diethyl ether for 40 hours removed only 2.3% of the sample. Subsequent extraction for 90 hours with methylene chloride removed an additional 0.02% of material. This indicates that the product contained a very high percentage of isotactic polymer.

By contrast, a sample of polybutene was prepared by the usual procedure without the use of an additive. The sample showed a relative crystallinity by infrared of 1.54. The material was then extracted for 72 hours in a Soxhlet extractor with methylene chloride. This treatment removed 11% of the polymer as a soluble fraction and left an insoluble residue which now showed a relative crystallinity of 1.74. Thus, the solvent extraction removed a considerable amount of the noncrystalline, atactic polymer, leaving a residue of higher crystallinity.

EXAMPLE 28

A series of propylene polymerizations was carried out as in Example 17 with various additives except that 5 ml. of a 10% slurry of titanium trichloride in isooctane was used. The results obtained are set out in Table 28.

Table 28

| Run No. | Additive | Relative crystallinity | LVN | Yield (g.) |
|---|---|---|---|---|
| 1 | None | .784 | 3.08 | 6.8 |
| 2 | Ethylene glycol hexyl methyl ether | .852 | 4.07 | 8.7 |
| 3 | do | .848 | 4.34 | 8.6 |
| 4 | 2-ethoxyethylamine | .889 | 1.94 | 7.8 |
| 5 | do | .861 | 1.86 | 8.0 |
| 6 | Bis(2-ethoxyethyl)amine | .818 | 4.23 | 8.0 |
| 7 | do | .852 | 4.11 | 7.7 |

EXAMPLE 29

Another series of propylene polymerizations was carried out as described in Example 17, except that 5 ml. of a 10% slurry of the complex $AlCl_3 \cdot 2TiCl_3$ in isooctane was used instead of titanium trichloride. The results are set out in Table 29.

Table 29

| Run No. | Additive | Relative crystallinity | LVN | Yield (g.) |
|---|---|---|---|---|
| 1 | None | .764 | 3.92 | 8.5 |
| 2 | do | .759 | 4.23 | 8.5 |
| 3 | 1,2-dimethoxyethane | .918 | 4.56 | 8.9 |
| 4 | do | .885 | 4.64 | 8.7 |

EXAMPLE 30

Several propylene polymerizations were carried out with triisobutylaluminum and titanium tetrachloride as the catalyst system. To a 12 oz. bottle containing 185 ml. of sodium-dried n-heptane was added 0.3 ml. (0.5 gram) of titanium tetrachloride and 10 ml. of a 0.1 molar solution of the additive in n-heptane. Ten ml. of a 25% by weight solution of triisobutylaluminum (1.7 g.) in n-heptane was added and then propylene was introduced to bring the autogenous pressure to 30 p.s.i.g. The bottle was agitated overnight (16 hours) in a water bath maintained at 75° C. The insoluble polymer was isolated and analyzed as described in Example 1. The results are presented in Table 30.

*Table 30*

| Run No. | Additive | Relative crystallinity | LVN | Yield (g.) |
|---|---|---|---|---|
| 1 | None | .732 | 2.01 | 3.4 |
| 2 | do | .731 | 3.03 | 2.0 |
| 3 | N,N-diethylaminomethyl methyl ether. | .798 | 2.35 | 2.2 |

EXAMPLE 31

Another series of propylene polymerizations was carried out with the catalyst system of Example 30, except that 1.5 ml. (2.6 g.) of titanium tetrachloride was used. The procedure was the same as Example 30. The results are set out in Table 31.

*Table 31*

| Run No. | Additive | Relative crystallinity | LVN | Yield (g.) |
|---|---|---|---|---|
| 1 | None | (*) | (*) | 0.1 |
| 2 | do | (*) | (*) | 0.1 |
| 3 | Bis(2-ethoxyethyl)amine | .708 | 1.71 | 0.4 |

*Yield too low to determine relative crystallinity or LVN.

EXAMPLE 32

Propylene was polymerized by the procedure of Example 17 with diethyl zinc and titanium tetrachloride as the catalyst. 2-ethoxyethylamine was used as the additive and a control run was made in which no additive was used. The catalyst system was prepared by adding 1.51 ml. (2.6 grams) of titanium tetrachloride to 185 ml. of sodium-dried n-heptane, then 10 ml. of a 0.1 molar solution of the additive in n-heptane (when the additive was used), and then 5 ml. of a 50% by weight solution of diethyl zinc in n-heptane was added. The results are set out in Table 32.

*Table 32*

| Run No. | Additive | Relative crystallinity | LVN | Yield (g.) |
|---|---|---|---|---|
| 1 | None | .750 | 0.89 | 1.2 |
| 2 | 2-ethoxyethylamine | .856 | 1.49 | 0.7 |

EXAMPLE 33

Propylene was polymerized with diethyl zinc and titanium tetrachloride as described in Example 32 except that 2 ml. (3.6 g.) of titanium tetrachloride and 3.6 ml. (4.2 g.) of diethyl zinc were used. Several other additives were used. The results are presented in Table 33.

*Table 33*

| Run No. | Additive | Relative crystallinity | LVN | Yield (g.) |
|---|---|---|---|---|
| 1 | None | (*) | | 0.6 |
| 2 | Bis(2-ethoxyethyl) amine | .820 | 0.61 | 1.5 |

*The product obtained when no catalyst additive was used was a noncrystalline, sticky grease.

EXAMPLE 34

Propylene was polymerized using titanium tetrabromide and triisobutylaluminum as the Ziegler-type catalyst. The procedure was the same as described in Example 30 except that 10 ml. of a 20% by weight solution of titanium tetrabromide in n-heptane was used in place of titanium tetrachloride. Table 34 gives the results.

*Table 34*

| Run No. | Additive | Relative crystallinity | LVN | Yield (g.) |
|---|---|---|---|---|
| 1 | None | .712 | 2.81 | 1.1 |
| 2 | N,N-diethylaminomethyl methyl ether. | .756 | 2.32 | 1.3 |

EXAMPLE 35

Propylene was polymerized using vanadium oxychloride and triisobutylaluminum as the Ziegler-type catalyst. The procedure was the same as described in Example 30 except that 1.5 ml. (2.7 g.) of VOCl₃ and 20 ml. of a 25% by weight solution of triisobutylaluminum (3.4 g.) in n-heptane were used. 2-ethoxyethylamine was used as the catalyst additive. Table 35 gives the results.

*Table 35*

| Run No. | Additive | Relative crystallinity | LVN | Yield (g.) |
|---|---|---|---|---|
| 1 | None | .556 | 1.67 | 1.4 |
| 2 | 2-ethoxyethylamine | .567 | 1.76 | 1.5 |

EXAMPLE 36

Propylene was polymerized using vanadium oxychloride and diisobutylaluminum hydride as the Ziegler-type catalyst. The procedure was as described in Example 30 except that 1.5 ml. (2.7 g.) of VOCl₃ and 20 ml. of a 0.9 molar solution of diisobutylaluminum hydride in n-decane were used. 1,2-dimethoxyethane was the catalyst additive. The results are presented in Table 36.

*Table 36*

| Run No. | Additive | Relative crystallinity | LVN | Yield (g.) |
|---|---|---|---|---|
| 1 | None | .567 | 1.82 | 2.1 |
| 2 | 1,2-dimethoxyethane | .685 | 1.87 | 1.9 |

EXAMPLE 37

Propylene was polymerized using titanium trichloride and diisobutylaluminum hydride as the Ziegler-type catalyst. The procedure was as described in Example 30 except that 0.5 gram of titanium trichloride and 10 ml. of a 0.9 molar solution of diisobutylaluminum hydride in n-decane were used. Table 37 gives the results.

Table 37

| Run No. | Additive | Relative crystallinity | LVN | Yield (g.) |
|---|---|---|---|---|
| 1 | None | .832 | 2.64 | 7.3 |
| 2 | 1,2-dimethoxyethane | .945 | 3.75 | 8.8 |
| 3 | 2-ethoxyethylamine | .907 | 2.10 | 8.6 |

EXAMPLE 38

Styrene was polymerized in the presence of several additives by the general procedure described in Example 23. Ten ml. of a 10% slurry of titanium trichloride in n-heptane, 20 ml. of a 25% by weight solution of triisobutylaluminum (3.4 g.) in n-heptane and 10 ml. of a 0.1 molar solution of additive in n-heptane (corresponding to a molar ratio of additive to aluminum compound of 0.055) were charged into a 12 oz. bottle containing 180 ml. of sodium-dried n-heptane. Styrene (16.6 ml.; 15 g.) was added to the bottle and the resulting mixture agitated overnight (16 hours) in a water bath maintained at 75° C. The solid polymer was isolated by the usual procedure. Table 38 gives the results.

Table 38

| Run No. | Additive | Relative crystallinity | LVN | Yield (g.) |
|---|---|---|---|---|
| 1 | None | | | 0 |
| 2 | do | | | 0 |
| 3 | 1,3-dimethoxypropanol-2 | Highly isotactic. | 3.80 | 1.5 |
| 4 | 1,3-dimethoxypropanol-2 | Highly isotactic. | 3.87 | 2.0 |
| 5 | 2-ethoxyethylamine | Highly isotactic. | 2.37 | 1.7 |
| 6 | Bis(2-ethoxyethyl)amine | Highly isotactic. | Insol. | 0.3 |

EXAMPLE 39

Several aminoalcohols were used as a catalyst component in the polymerization of proplyene and 1-butene.

The polymerizations were run in a 1.7 liter glass pressure reactor. The reactor was fitted with a stirrer, thermocouple, cooling coil, and a charging port. Before each run the vessel was cleaned, dried, flushed with hot dry heptane, emptied, and purged with dry argon.

The aminoalcohols used were commercial grade and were used pure.

The catalysts for the polymerization of propylene and 1-butene were prepared in the same manner. TiCl$_3$ (6.6 millimoles) was weighed into a flask in a dry box. The TiCl$_3$ was slurried in 50 ml. of dry n-heptane and the flask closed. The flask was removed from the dry box and the aminoalcohol additive (2.0 millimoles) was added by means of a hypodermic syringe. This mixture was stirred with a magnetic stirrer with a Teflon coated stir-bar for 10 minutes at room temperature. This slurry was added to the reactor which contained 1 liter of dry n-heptane and 20 millimoles of triethylaluminum. The reactor was sealed and brought up to polymerization temperature, 75° C. The monomer was then let in at the pressure designated in the Table. In each propylene polymerization the rate of polymerization was followed by the uptake of monomer from a reservoir. The polymerization rate was calculated from the initial portion of the polymerization, the first 10–20 minutes, which indicated a rather constant uptake of monomer with time. At the end of the polymerization the reactor was vented, the slurry cooled, and the reactor disassembled. The polymer was isolated in such a manner so that less than 1% of the total polymer remained in the reaction liquor. Thus, the data listed in Table 39 represents essentially all of the polymer prepared.

The results of the polymerizations are shown in Table 39 following.

Table 39

PART 1
*Aminoalcohol additives; polymerizations at 75° C.*

| Run No. | Additive | Monomer | Metal halide conc., mM. | Additive conc., mM. | Al (C$_2$H$_5$)$_3$ conc., mM. | Reactor pressure, p.s.i.g. |
|---|---|---|---|---|---|---|
| 1 | 2-diethylamino ethanol | C$_3$H$_6$ | TiCl$_3$, 6.6 | 2.0 | 20 | 50 |
| 2 | 3-di-n-butyl-amino-1-propanol | C$_3$H$_6$ | TiCl$_3$, 6.6 | 2.0 | 20 | 50 |
| 3 | 3-dimethylamino-1,2-propanediol | C$_3$H$_6$ | TiCl$_3$, 6.6 | 2.0 | 20 | 50 |
| 4 | 2-(2-aminoethylamino) ethanol | C$_3$H$_6$ | TiCl$_3$, 6.6 | 2.0 | 20 | 50 |
| 5 | 2-dimethylaminoethanol | C$_3$H$_6$ | TiCl$_3$, 6.6 | 2.0 | 20 | 50 |
| 6 | Methyldiethanolamine | C$_3$H$_6$ | TiCl$_3$, 6.6 | 2.0 | 20 | 50 |
| 7 | Aminoethylethanolamine | C$_3$H$_6$ | TiCl$_3$, 6.6 | 2.0 | 20 | 50 |
| 8 | 2-dimethylamino-2-propanol | C$_3$H$_6$ | TiCl$_3$, 6.6 | 2.0 | 20 | 50 |
| 9 | 2-propanol | C$_3$H$_6$ | TiCl$_3$, 6.6 | 2.0 | 20 | 50 |
| 10 | Same as run 1 | α-C$_4$H$_8$ | TiCl$_3$, 6.6 | 2.0 | 20 | 20 |
| 11 | Same as run 3 | α-C$_4$H$_8$ | TiCl$_3$, 6.6 | 2.0 | 20 | 20 |

PART 2

| Run No. | Additive | Duration, min. | Polymer yield, g. | Polymerization rate, 10$^3$ moles l$^{-1}$ min.$^{-1}$ | Polymer density g./ml. | LVN | Isotacticity, percent |
|---|---|---|---|---|---|---|---|
| 1 | 2-diethylamino ethanol | 60 | 175 | 67 | | 4.64 | 90.4 |
| 2 | 3-Di-n-butylamino-1-propanol | 60 | 144 | 46 | | 4.17 | 91.4 |
| 3 | 3-dimethylamino-1,2-propanediol | 60 | 101 | 31 | | 4.74 | 92.7 |
| 4 | 2-(2-aminoethylamino) ethanol | 60 | 94 | 32 | | 4.29 | 90.0 |
| 5 | 2-dimethylamino ethanol | 60 | 228 | 100 | | 4.62 | 89.6 |
| 6 | Methyldiethanolamine | 60 | 43 | 36 | | 3.93 | 87.6 |
| 7 | Aminoethylethanolamine | 60 | 126 | 47 | | 3.78 | 85.5 |
| 8 | 2-dimethylamino-2-propanol | 60 | 203 | 75 | | 4.10 | 86.3 |
| 9 | 2-propanol | 60 | 51 | 10 | | 3.33 | 91.2 |
| 10 | Same as run 1 | 60 | 41 | | *0.945 | 1.647 | |
| 11 | Same as run 3 | 20 | 0 | | | | |

*Dirty sample.

In the polymerization of propylene using an aminoalcohol additive the isotacticity is increased from about 70–75% to about 90%. There does not appear to be any advantage of the aminoalcohols over 2-propanol with respect to isotacticity but there is a clear advantage as to polymerization rate. Propylene polymerizations run at higher polymerization rates when aminoalcohols are used as the additive.

EXAMPLE 40

1-butene was polymerized using the catalyst systems and amounts of materials described in Example 39 but with N'-(2-hydroxypropyl)-2-methyl-1, 2-propanediamine, dimethylaminoethanol and 1,3-bis(dimethylamino)-2-propanol as the aminoalcohols. These additives gave results with this monomer comparable to those studied and reported in Example 39.

EXAMPLE 41

Propylene was polymerized using the catalyst systems and amounts of materials described in Example 39, but with 1,3-bis-(dimethylamino)-2-propanol and 1-dimethylamino-2-propanol as the additives. These additives gave results with this monomer comparable to those studied and reported in Example 39.

Having described my invention and the preferred embodiments thereof, I claim:

1. A polymerization catalyst combination comprising:
   (a) an organometallic compound in which the metal therein is selected from a member of the group consisting of Groups IIA, IIB and IIIA of the Periodic Table;
   (b) a metal halide in which the metal therein is selected from a member of the group consisting of Groups IVB, VB and VIB of the Periodic Table; and
   (c) a polyamine which chelates metals.

2. A polymerization catalyst combination comprising:
   (a) an organometallic compound in which the metal therein is selected from a member of the group consisting of Groups IIA, IIB and IIIA of the Periodic Table;
   (b) a metal halide in which the metal therein is selected from a member of the group consisting of Groups IVB, VB and VIB of the Periodic Table; and
   (c) an aminoether which chelates metals.

3. A polymerization catalyst combination comprising:
   (a) an organometallic compound in which the metal therein is selected from a member of the group consisting of Groups IIA, IIB and IIIA of the Periodic Table;
   (b) a metal halide in which the metal therein is selected from a member of the group consisting of Groups IVB, VB and VIB of the Periodic Table; and
   (c) an aminoalcohol which chelates metals.

4. A polymerization catalyst combination comprising:
   (a) an organometallic compound in which the metal therein is selected from a member of the group consisting of Groups IIA, IIB and IIIA of the Periodic Table;
   (b) a metal halide in which the metal therein is selected from a member of the group consisting of Groups IVB, VB and VIB of the Periodic Table; and
   (c) a hydroxyether which chelates metals.

5. A polymerization catalyst combination comprising a trialkyl aluminum, titanium trichloride and N,N,N',N'-tetramethylmethylenediamine.

6. A polymerization catalyst combination comprising a trialkyl aluminum, titanium trichloride and N,N,N',N'-tetramethylethylenediamine.

7. A polymerization catalyst combination comprising a trialkyl aluminum, titanium trichloride and N,N'-diethylethylenediamine.

8. A polymerization catalyst combination comprising a trialkyl aluminum, titanium trichloride and N, N', N'' trimethyldiethylenediamine.

9. A polymerization catalyst combination comprising a trialkyl aluminum, titanium trichloride and 1,2 dimethoxyethane.

10. A polymerization catalyst combination comprising a trialkyl aluminum, titanium trichloride and diethyleneglycol dimethyl ether.

11. A polymerization catalyst combination comprising a trialkyl aluminum, titanium trichloride and 2-diethylamino ethanol.

12. A polymerization catalyst combination comprising a trialkyl aluminum, titanium trichloride and 3-di-n-butylamino-1-propanol.

13. A polymerization catalyst combination comprising a trialkyl aluminum, titanium trichloride and 3-dimethylamino-1,2-propanediol.

14. A polymerization catalyst combination comprising a trialkyl aluminum, titanium trichloride and 2-(2-aminoethylamino) ethanol.

15. A polymerization catalyst combination comprising a trialkyl aluminum, titanium trichloride and 2-dimethylaminoethanol.

16. A polymerization catalyst combination comprising a trialkyl aluminum, titanium trichloride and methyldiethanolamine.

17. A polymerization catalyst combination comprising a trialkyl aluminum, titanium trichloride and 1,3-bis (dimethylamino)-2-propanol.

18. A polymerization catalyst combination comprising a trialkyl aluminum, titanium trichloride and 2-dimethylamino-2-propanol.

19. A polymerization catalyst combination comprising a trialkyl aluminum, titanium trichloride and N-ethyl morpholine.

20. A polymerization catalyst combination comprising a trialkyl aluminum, titanium trichloride and 2-ethoxyethylamine.

21. A polymerization catalyst combination comprising a trialkyl aluminum, titanium trichloride and 1,3-dimethoxy-propanol-2.

22. The process of polymerizing a mono-1-olefin of three to eight carbon atoms which comprises effecting the polymerization with a catalyst combination comprising:
   (a) an organometallic compound in which the metal therein is selected from a member of the group consisting of Groups IIA, IIB and IIIA of the Periodic Table;
   (b) a metal halide in which the metal therein is selected from a member of the group consisting of Groups IVB, VB and VIB of the Periodic Table; and
   (c) an additive compound selected from a member of the group consisting of those polyamines, polyethers, aminoethers, aminoalcohols and hydroxyethers which chelate metals.

23. Process of claim 22 wherein said organometallic compound is an organoaluminum compound and said metal halide is a titanium halide.

24. The process of claim 22 wherein said organometallic compound is an organo aluminum compound and wherein said metal halide is a vanadium halide.

25. The process of polymerizing a mono-1-olefin of three to eight carbon atoms which comprises effecting the polymerization with a catalyst combination comprising:
   (a) an aluminum trialkyl,
   (b) titanium trichloride,
   (c) an additive compound selected from a member of the group consisting of those polyamines, polyethers, aminoethers, aminoalcohols and hydroxyethers which chelate metals.

26. The process of polymerizing a mono-1-olefin of three to eight carbon atoms which comprises effecting the polymerization with a catalyst combination comprising:
  (a) an aluminum trialkyl,
  (b) vanadium trichloride,
  (c) an additive compound selected from a member of the group consisting of those polyamines, polyethers, aminoethers, aminoalcohols and hydroxyethers which chelate metals.

References Cited by the Examiner
UNITED STATES PATENTS 2,886,561 1/1959 Reynolds et al. _____ 260—94.9
2,932,633 4/1960 Juveland et al. _____ 260—94.9

FOREIGN PATENTS 564,772 8/1958 Belgium.

JOSEPH L. SCHOFER, *Primary Examiner.*
JAMES A. SEIDLECK, *Examiner.*

PO-1050
(5/69)

UNITED STATES PATENT OFFICE
CERTIFICATE OF CORRECTION

Patent No. 3,219,648     Dated November 23, 1965

Inventor(s)     Robert W. Hill

It is certified that error appears in the above-identified patent and that said Letters Patent are hereby corrected as shown below:

Column 4, line 40, reading "0.50" should read --0.05--.

Signed and Sealed
SEP 22 1970

(SEAL)
Attest:

Edward M. Fletcher, Jr.
Attesting Officer

WILLIAM E. SCHUYLER, JR.
Commissioner of Patents